(12) United States Patent
Ma et al.

(10) Patent No.: US 11,130,324 B2
(45) Date of Patent: *Sep. 28, 2021

(54) DECORATIVE LAMINATES HAVING A TEXTURED SURFACE EXHIBITING A FINGERPRINT PROOF SURFACE

(71) Applicant: Wilsonart LLC, Temple, TX (US)

(72) Inventors: Muyuan M. Ma, Austin, TX (US); Rajesh Ramamurthy, Temple, TX (US)

(73) Assignee: WILSONART LLC, Austin, TX (US)

( * ) Notice: Subject to any disclaimer, the term of this patent is extended or adjusted under 35 U.S.C. 154(b) by 72 days.

This patent is subject to a terminal disclaimer.

(21) Appl. No.: 14/593,198

(22) Filed: Jan. 9, 2015

(65) Prior Publication Data

US 2015/0191042 A1  Jul. 9, 2015

Related U.S. Application Data

(60) Provisional application No. 61/925,557, filed on Jan. 9, 2014.

(51) Int. Cl.
*B32B 29/00* (2006.01)
*B32B 37/18* (2006.01)
(Continued)

(52) U.S. Cl.
CPC .............. *B32B 29/005* (2013.01); *B32B 7/06* (2013.01); *B32B 37/18* (2013.01); *B44C 1/24* (2013.01);
(Continued)

(58) Field of Classification Search
CPC ......... B32B 29/005; B32B 7/06; B32B 37/18; B32B 2250/26; B32B 2307/748; B32B 2307/73; B32B 2260/046; B32B 2260/028; B32B 2317/125; B32B 2419/00; B32B 2607/00; B32B 2451/00; B44C 5/0469; B44C 1/24; Y10T 156/1041;
(Continued)

(56) References Cited

U.S. PATENT DOCUMENTS

| 4,284,453 A | 8/1981 | Endrizzi |
| 4,311,766 A * | 1/1982 | Mattor ................... B29C 33/62 156/232 |
| 4,327,121 A * | 4/1982 | Gray, III .............. D21H 27/001 156/247 |
| 6,423,167 B1 | 7/2002 | Palmer et al. |

(Continued)

FOREIGN PATENT DOCUMENTS

| EP | 0474470 A2 | 3/1992 |
| EP | 2527408 A1 | 11/2012 |

(Continued)

*Primary Examiner* — Nancy R Johnson
(74) *Attorney, Agent, or Firm* — Welsh Flaxman & Gitler LLC

(57) ABSTRACT

A decorative laminate lay-up used in the manufacture of decorative laminates includes a decorative laminate sheet assembly composed of resin impregnated paper layers and a textured release sheet positioned on a top surface of the decorative laminate sheet assembly. The textured release sheet provides a textured surface to decorative laminates resulting from processing of the decorative laminate sheet assembly, wherein the textured release sheet includes a textured surface exhibiting anti-reflective, hydrophobic and oleophobic characteristics leading to a fingerprint proof surface.

8 Claims, 14 Drawing Sheets

(51) Int. Cl.
*B44C 1/24* (2006.01)
*B32B 7/06* (2019.01)
*B44C 5/04* (2006.01)

(52) U.S. Cl.
CPC ........ *B44C 5/0469* (2013.01); *B32B 2250/26* (2013.01); *B32B 2260/028* (2013.01); *B32B 2260/046* (2013.01); *B32B 2307/73* (2013.01); *B32B 2307/748* (2013.01); *B32B 2317/125* (2013.01); *B32B 2419/00* (2013.01); *B32B 2451/00* (2013.01); *B32B 2607/00* (2013.01); *Y10T 156/1041* (2015.01); *Y10T 428/24355* (2015.01)

(58) Field of Classification Search
CPC .......... Y10T 428/24355; B08B 17/065; B29C 39/026; B29C 39/148; B29C 43/021; B29C 43/022; B29C 2043/3634; B29C 59/02; B29C 59/022; B29C 59/023
See application file for complete search history.

(56) References Cited

U.S. PATENT DOCUMENTS

| | | |
|---|---|---|
| 9,809,013 B2 | 11/2017 | Haller et al. |
| 2001/0046590 A1 | 11/2001 | Benton et al. |
| 2003/0003257 A1 | 1/2003 | Kendall et al. |
| 2004/0089409 A1 | 5/2004 | Kendall et al. |
| 2011/0024938 A1 | 2/2011 | Tripp et al. |
| 2011/0042000 A1 | 2/2011 | Wilde et al. |
| 2013/0115420 A1* | 5/2013 | Park .................. B32B 3/30 428/141 |
| 2015/0290910 A1 | 10/2015 | Haller et al. |

FOREIGN PATENT DOCUMENTS

| | | |
|---|---|---|
| JP | S63307945 A | 12/1988 |
| JP | 2017128634 A | 7/2017 |
| WO | 2012122206 A1 | 9/2012 |
| WO | 2013133862 A1 | 9/2013 |
| WO | 2013154695 A1 | 10/2013 |
| WO | 2014075804 A1 | 5/2014 |

* cited by examiner

DECORATIVE LAMINATES HAVING A TEXTURED SURFACE EXHIBITING A FINGERPRINT PROOF SURFACE

CROSS REFERENCE TO RELATED APPLICATION

This application claims the benefit of U.S. Provisional Patent Application Ser. No. 61/925,557, entitled "DECORATIVE LAMINATES HAVING A TEXTURED SURFACE EXHIBITING A FINGERPRINT PROOF SURFACE," filed Jan. 9, 2014.

BACKGROUND OF THE INVENTION

1. Field of the Invention

The invention relates to decorative laminates. More particularly, the invention relates to a method for producing decorative laminates having a textured surface exhibiting a fingerprint proof surface, that is, a surface not showing fingerprints and remaining clean and clear despite regular use.

2. Description of the Related Art

High pressure decorative laminates are currently manufactured with smooth glossy surfaces, textured surfaces, or deeply sculpted and embossed surfaces. As general background, decorative laminates prepared by heat and pressure consolidation have been produced commercially for a number of years, and have found widespread acceptance in the building and furniture industry as counter and tabletops, bathroom and kitchen work surfaces, wall paneling, flooring products, partitions and doors. These decorative laminates may be described as containing a number of laminae consolidated to form a unitary structure carrying a surface decoration. The surface decoration may range from something as simple as a solid color to something as complex as an embossed simulated wood grain finish.

Decorative laminates generally include plural layers of synthetic resin impregnated paper sheets bonded under heat and pressure to form a unitary structure. In normal practice, a decorative laminate sheet assembly, from the bottom up, includes a core of one or more phenolic resin impregnated sheets, above which lies a decorative melamine impregnated sheet. The decorative sheet may be further covered with a melamine impregnated overlay. The core, or base, functions to impart rigidity to the decorative laminate and usually includes a solid substrate which may, or may not, be formed prior to the initial laminating steps. Prior to stacking, the sheets of the core member are impregnated with a water alcohol solution of phenol formaldehyde, dried and partially cured in a hot oven, and finally cut into shapes.

The core may, for example, include a plurality of sheets of 90-150 pound phenolic resin impregnated Kraft paper and a substrate. The Kraft paper is impregnated throughout and bonded with a substantially completely cured phenolic resin which has been converted to a thermoset state during the initial laminating step. The substrate may be a pre-cured plastic laminate, such as glass fiber-reinforced thermoset polyester resin laminates and the like, a wood product, such as hardboard, wood waste or particle boards, plywood and the like, a mineral base board, such as, cement-asbestos board, sheet rock, plaster board, and the like, or a combination of substrates.

The decorative sheet provides the decorative laminate with an attractive appearance. The decorative sheet also dictates the surface characteristics of the decorative laminate. For example, the composition of the decorative sheet dictates the decorative laminate's resistance to chemical agents, heat, light, shock and abrasion. Decorative sheets are commonly manufactured from high quality 50-125 ream weight, pigment filled, alpha cellulose paper impregnated with a water alcohol solution of melamine formaldehyde resin. The resin impregnated decorative sheets are subsequently dried, partially cured, and finally cut into sheets. The pigment filled, alpha cellulose paper of the decorative sheet, may include a solid color, a decorative design, or a rotogravure reproduction of natural materials, such as, wood, marble, leather, etc. The aesthetic characteristics of the cellulose paper are revealed as the laminate's decorative design upon completion of the decorative laminate.

Decorative laminates are generally manufactured by placing the resin impregnated core and decorative sheet between steel plates and subjecting the decorative laminate stack to pressure in the range of about 800-1600 psi for a time sufficient to consolidate the laminate and cure the resins (generally about 25 minutes to an hour). The pressure and heat force the resin in the paper sheets to flow, cure and consolidate the sheets into a unitary laminated mass referred to in the art as a decorative high pressure laminate. Finally, the formed decorative laminate is bonded to a reinforcing substrate, such as, plywood, hardboard, asbestos board, particle board or the like.

Generally, more than one laminate is formed at one time. Multiple laminates are formed by inserting a plurality of assembled sheets in a stack. Release sheets are positioned between the assembled sheets to separate the various laminates stacked together. After consolidation, the release sheets allow the individual laminates to be separated.

Textured decorative laminates are also very popular. The textured surfaces range from relatively shallow depressions, such as, textured (e.g., satin, matte or semigloss) surfaces, to relatively deeply sculpted or embossed surfaces having a noticeable three-dimensional effect, such as, wood grain, leather, slate, abstract patterns, creative designs etc. The textured laminates are commonly manufactured using release sheets with the desired surface texture, which surface texture is imparted to the decorative laminate during the application of heat and pressure in the manufacturing process.

It has, however, been found that high pressure decorative laminates are susceptible to a build-up of fingerprints as the surface of the high pressure decorative laminate is touched during the course of the day. The fingerprints remain visible and can become highly distracting. Prior attempts to address this problem have relied upon chemically modified surfaces to achieve the purpose. However, such attempts have only led to limited success. As such, a need remains for a high pressure decorative laminate that is not susceptible to a build-up of fingerprints on the surface thereof.

SUMMARY OF THE INVENTION

It is, therefore, an object of the present invention to provide a decorative laminate lay-up used in the manufacture of decorative laminates. The decorative laminate lay-up includes a decorative laminate sheet assembly composed of resin impregnated paper layers. The decorative laminate also includes a textured release sheet positioned on a top surface of the decorative laminate sheet assembly. The textured release sheet provides a textured surface to decorative laminates resulting from processing of the decorative laminate sheet assembly, wherein the textured release sheet includes a textured surface exhibiting anti-reflective, hydrophobic and oleophobic characteristics leading to a fingerprint proof surface.

It is also an object of the present invention to provide a decorative laminate lay-up wherein the textured release sheet is cast.

It is another object of the present invention to provide a decorative laminate lay-up wherein the textured release sheet is an acrylic coated paper.

It is a further object of the present invention to provide a decorative laminate lay-up wherein the textured surface of the textured release sheet includes a plurality of protrusions producing a water contact angle of >110° degrees.

It is also an object of the present invention to provide a decorative laminate lay-up wherein the protrusions are circular and have a height of between 5 μm and 20 μm, a circle diameter between 2.92 μm and 6.14 μm, and are spaced from a center of the protrusions to a center of next adjacent protrusions by a distance of approximately 6.14 μm to approximately 23.97 μm.

It is another object of the present invention to provide a decorative laminate lay-up wherein the decorative laminate sheet assembly includes an overlay paper layer, a decorative layer, and a core layer, and the textured release sheet is positioned on top of the overlay paper layer.

It is a further object of the present invention to provide a decorative laminate lay-up wherein the overlay paper layer is a melamine impregnated paper layer.

It is also an object of the present invention to provide a decorative laminate lay-up wherein the protrusions are capsule shaped and have a height of between 5 μm and 20 μm, a length of approximately 14.91 μm to approximately 29.82 μm, a width of approximately 2.92 μm to approximately 6.14 μm, a distance between a first semi-circular end of one protrusion and a second semi-circular end of another protrusion of approximately 3.23 μm to approximately 18.12 μm, a distance from an upper side wall of an upper protrusion and an upper side wall a lower protrusion lying directly below an upper protrusion of approximately 6.14 μm to approximately 23.97 μm.

It is also an object of the present invention to provide a decorative laminate manufactured in accordance with the method comprising assembling a decorative laminate sheet assembly composed of resin impregnated paper layers, positioning a texture imparting member on a top surface of the decorative laminate sheet assembly, applying heat and pressure to the decorative laminate sheet assembly and the texture imparting member sufficient to bond layers of the decorative laminate sheet assembly for the formation of a decorative laminate, wherein the texture imparting member includes a textured surface exhibiting anti-reflective, hydrophobic and oleophobic characteristics leading to a fingerprint proof surface. The method also includes removing the texture imparting member from the top surface of the decorative laminate revealing a textured surface exhibiting anti-reflective, hydrophobic and oleophobic characteristics leading to a fingerprint proof surface.

It is another object of the present invention to provide a decorative laminate wherein the texture imparting member is textured release sheet that is cast.

It is a further object of the present invention to provide a decorative laminate wherein the texture imparting member is a textured press plate.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

Figure 1:
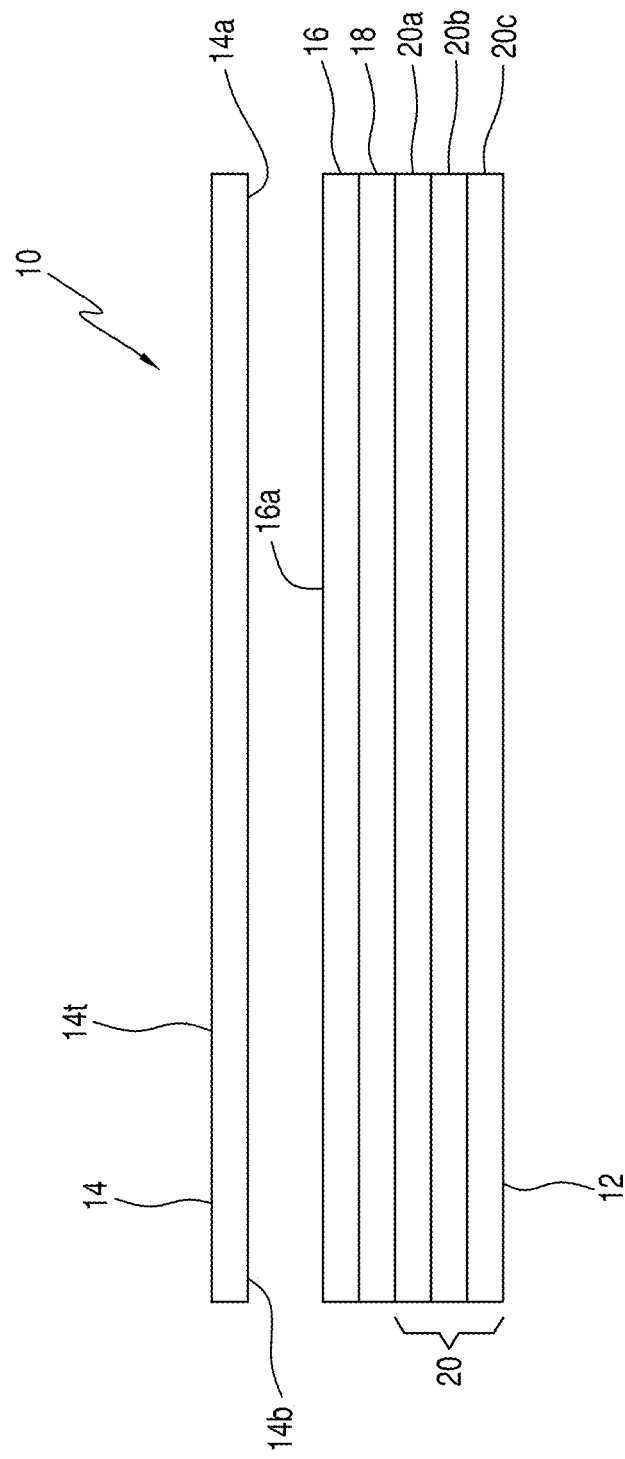
FIG. 1 is a schematic of a laminate lay-up in accordance with the present invention.
Figure 2:
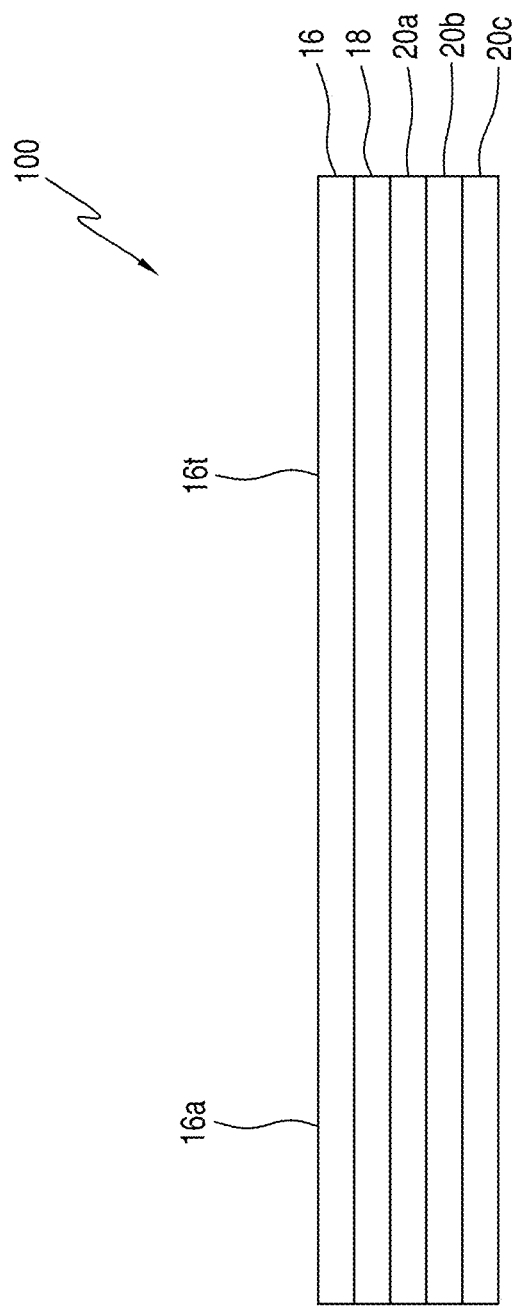
FIG. 2 is a schematic of a decorative laminate produced in accordance with the present invention.

With reference to FIG. 1, a decorative laminate lay-up 10 including a decorative laminate sheet assembly 12 (composed of an exterior overlay paper layer 16, a decorative layer 18, and a core layer 20 as discussed below in greater detail) and a texture imparting member in the form of a textured release sheet 14 (including a top side 14t and a bottom side 14b) is disclosed. The decorative laminate lay-up 10 is used in the manufacture of decorative laminates 100 (see FIG. 2) in accordance with the present invention. The textured release sheet 14 provides a textured surface 14a (formed on the bottom side 14b thereof) to a resulting decorative laminate 100, wherein the textured surface 14a results in a decorative laminate 100 that is not susceptible to a build-up of fingerprints on the surface thereof. As will be appreciated based upon the following disclosure, the applied texture's physical attributes function to lower the surface energy to achieve the fingerprint proof properties (and also provide self-cleaning properties). It is further appreciated the release sheet 14 also functions as a release sheet between decorative laminate sheet assemblies 12. With this in mind, the present textured release sheets 14 may be used in gang processing of decorative laminates 100 or the present textured release sheets 14 may be used in the manufacture of single laminate sheets to simply impart a desired texture and gloss.

The decorative laminate lay-up 10 is assembled by first stacking a decorative laminate sheet assembly 12 having a top layer (which, as explained below, is preferably an overlay paper sheet 16). That is, the sheets used in the production of the decorative laminate 100 are stacked in preparation for the heating and pressure steps used to consolidate the laminate. A textured release sheet 14 is also prepared. In accordance with a preferred embodiment the textured release sheet 14 is an acrylic coated paper manufactured, for example, by Sappi Inc.

Although other manufacturing techniques may be employed without departing from the spirit of the present invention, the process for producing surface effects in a release coating as disclosed in U.S. Pat. No. 4,289,821, entitled "Surface Replication On A Coated Substrate," and U.S. Pat. No. 4,322,450 entitled "Surface Replication On A Coated Substrate," both of which are incorporated herein by reference, may be employed in the manufacture of textured release sheets for use in accordance with the present invention. Briefly, these patents teach techniques for producing surface effects in a release coating on a release sheet. In accordance with the disclosed methodology a coating of an electron beam radiation curable material is applied to one surface of a web substrate, the coated side of the substrate is pressed against a replicative surface having the desired surface effect to cause the coating to conform to the replicative surface, the coating is irradiated with electron beam radiation to cure the coating, and the substrate is stripped from the replicative surface with the cured coating adhered to the substrate (ultimately resulting in the textured release sheet after it is cut and ready for use in the manufacture of decorative laminate in the manner appreciated by those skilled in the art). The replicative surface is preferably a metal roll with either a pattern engraved in its surface or a highly polished smooth surface. This technique enables replication of the very fine patterns contemplated in accordance with the present invention.

The processes of the '821 patent and the '450 patent are preferably implemented using the coating compositions disclosed in U.S. Pat. No. 4,311,766, entitled "Release Coating," and U.S. Pat. No. 4,327,121, entitled "Release Coating," both of which are incorporated herein by reference. The '766 patent and '121 patent disclose electron beam curable coating compositions comprising acrylic functional materials and silicone release agents which may be used in the manufacture of release sheets.

The release sheet 14 is positioned on the top surface 16a (in the case of the present laminate sheet assembly 12 it is positioned on the upper surface of the overlay sheet 16) of the laminate sheet assembly 12 to form the laminate lay-up 10. The release sheet 14 is positioned on the overlay sheet 16 with the bottom side 14b (that is, the textured surface 14a) of the release sheet 14 facing the top surface 16a of the overlay sheet 16. Heat and pressure are then applied to the laminate sheet assembly 12 and the textured release sheet 14 sufficient to bond the layers of the decorative laminate sheet assembly 12, and releasably bond the textured release sheet 14 (in particular, the bottom side 14b with the textured surface 14a) to the top surface 16a of the decorative laminate sheet assembly 12. Finally, the textured release sheet 14 is removed from the top layer 16a of the formed decorative laminate 100 to reveal a decorative laminate 100 exhibiting desired texture characteristics.

In accordance with the present invention, and as discussed above, the release sheet 14 is formed with a textured surface 14a on the bottom side 14b thereof (the texture of which is ultimately applied to the top surface 16a of the decorative laminate 100) exhibiting anti-reflective, hydrophobic and oleophobic characteristics leading to a fingerprint proof surface, that is, a surface not showing fingerprints and remaining clean and clear dispute regular use. The release sheet 14 is preferably an acrylic coated paper manufactured by Sappi Inc. in the manner described above.

The texture of the textured surface 14a applied to the release sheet 14 (and ultimately applied to the top surface 16a of the resulting decorative laminate 100 as texture 16t resulting in a textured top surface 16a of the resulting decorative laminate 100) increases the water contact angles for water placed upon the textured surface 14a, suggesting that the bottom side 14b with the addition of textured surface 14a has become more hydrophobic. When the textured surface 14a (that is, the texture) of the release sheet 14 is applied to the decorative laminate 100 as discussed below in greater detail, the top surface 16a of the decorative laminate 100 is imparted with a texture 16t (that is, the decorative laminate 100 is provided with a textured surface) that is the same as the texture of the textured surface 14a of the release sheet making the laminate 100 less susceptible to the formation of annoying and undesirable fingerprints thereon.

Figure 3A:
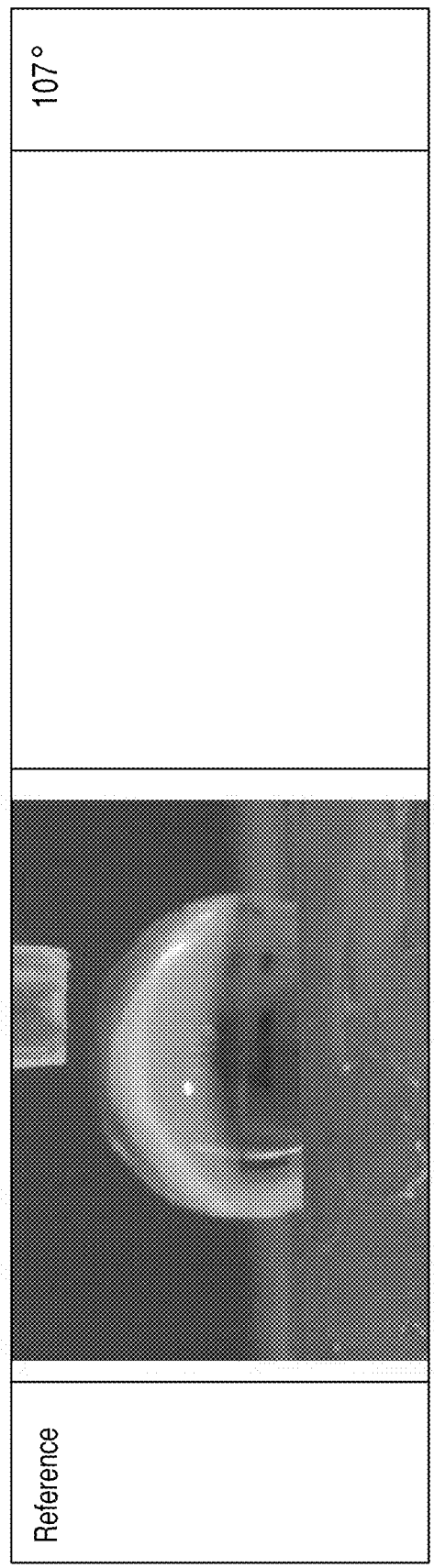
FIG. 3A shows a control test surface and its hydrophobic effects as demonstrated by the resulting water contact angle.

Specifically, and with reference to a control test surface as shown with reference FIG. 3A, the control test surface (that is, a relatively smooth silicone rubber) produces a water contact angle of 107° degrees when a droplet of water is applied thereto. As used herein the phrase "contact angle" or "water contact angle" is intended to the angle, conventionally measured through the liquid, where the water interface meets a solid surface. It quantifies the wettability of a solid surface by a liquid via the Young equation.

As will be explained below, surfaces with textures 16t that function in accordance with the present invention result in a water contact angle for a droplet of water that is from 115°-134° degrees. In accordance with a preferred embodiment of the present invention, it is desired to provide a textured surface resulting in a water contact angle of >110° degrees.

Summarizing, when such texture 16t is applied to the top surface 16a (this reference numeral is used for each of the embodiments disclosed below) of the decorative laminates 100 so as to provide for a textured top surface, the resulting hydrophobic characteristics result in the formation of a laminate not susceptible to the formation of annoying and undesirable fingerprints.

Surface 1

Figure 3B:
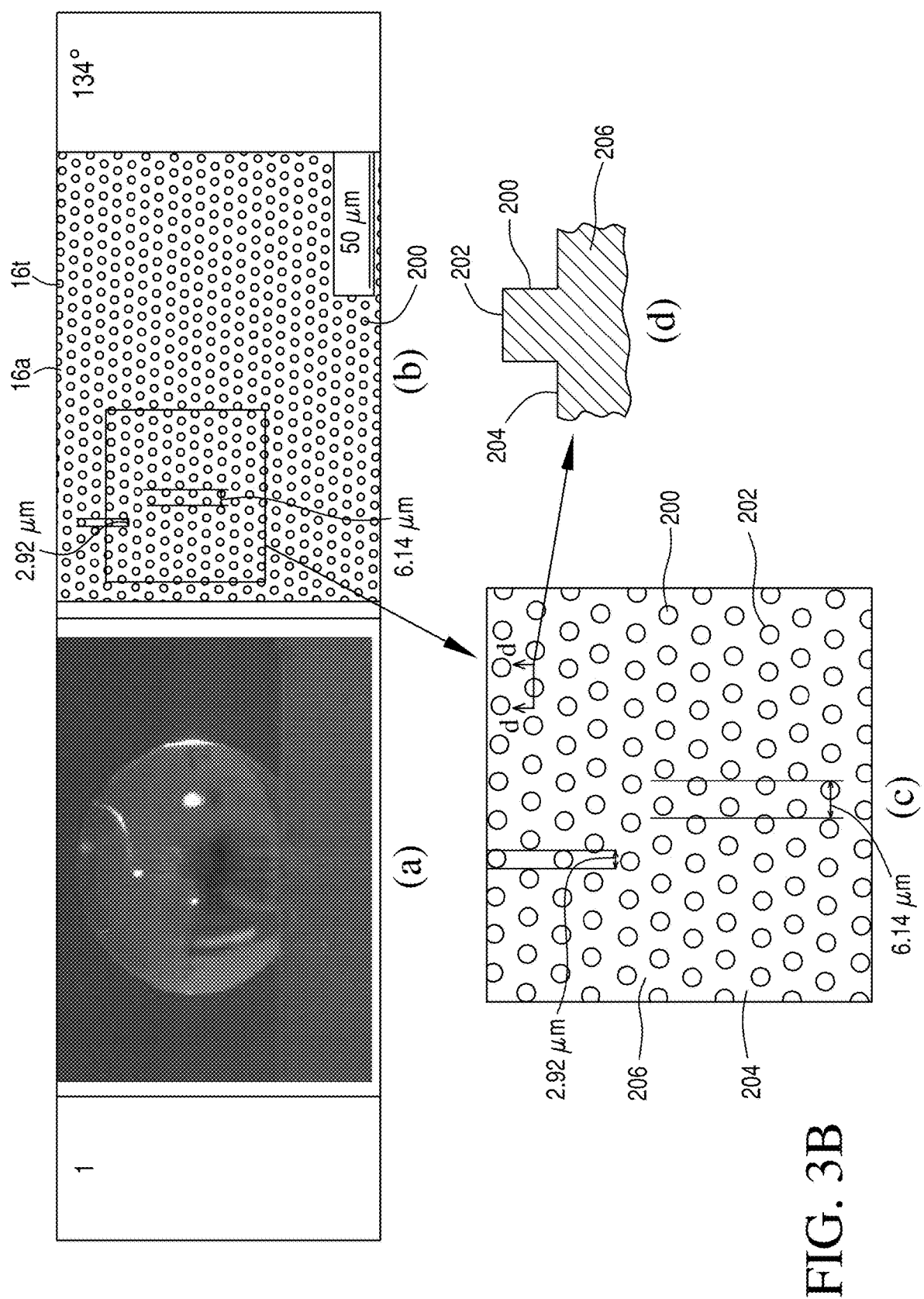
FIGS. 3B-3J show different surfaces and their hydrophobic effects as demonstrated by the resulting water contact angle, wherein view (a) is a side view showing the water on the surface; view (b) is a top plan view of the surface, view (c) is a detailed top plan view of the surface, and view (d) is a cross section view along the line d-d.

Referring to surface pattern 1 as disclosed in FIG. 3B, the texture 16t of the top surface 16a includes a plurality of circular (when viewed from above) protrusions 200 arranged in a repeating pattern so as to produce a water contact angle of approximately 134°. The protrusions 200 are substantially flat on their upper surfaces 202 which extend approximately 10 μm above the surface 204 of the underlying substrate 206 (although it is appreciated the height of each protrusion may be approximately 5 μm to 20 μm). Each circle has a diameter of approximately 2.92 μm. As to the spacing of the protrusions 200, they are spaced approximately 6.14 μm when measured from the center of the protrusions 200 to the center of the next adjacent protrusions 200.

Surface 2

Figure 3C:
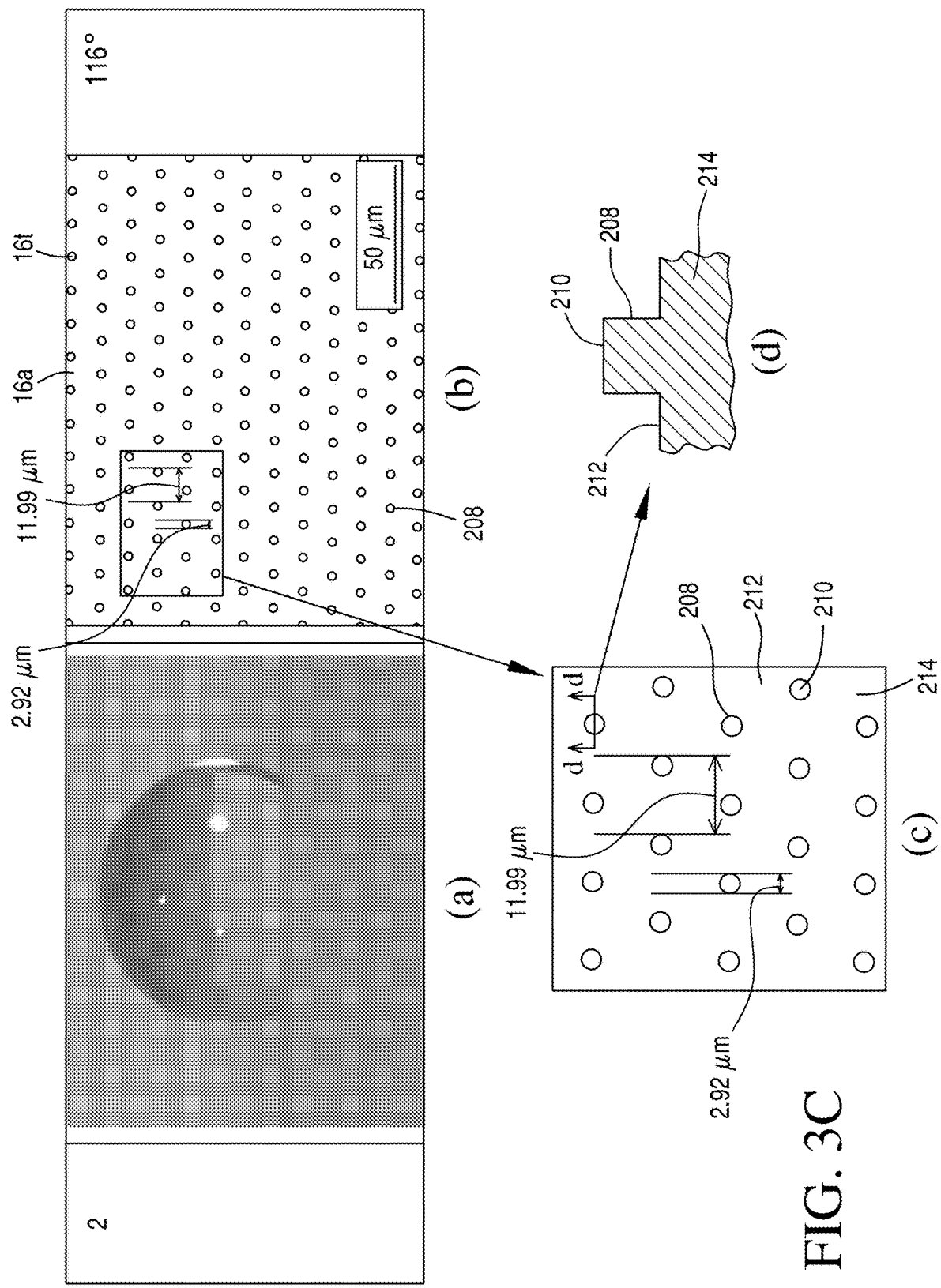

Referring to surface pattern 2 as disclosed in FIG. 3C, the texture 16t of the top surface 16a includes a plurality of circular (when viewed from above) protrusions 208 arranged in a repeating pattern so as to produce a water contact angle of approximately 116°. The protrusions 208 are substantially flat on their upper surfaces 210 which extend approximately 10 μm above the surface 212 of the underlying substrate 214 (although it is appreciated the height of each protrusion may be approximately 5 μm to 20 μm). Each circle has a diameter of approximately 2.92 μm. As to the spacing of the protrusions 208, they are spaced approximately 11.99 μm when measured from the center of the protrusions 208 to the center of the next adjacent protrusions 208.

Surface 3

Figure 3D:
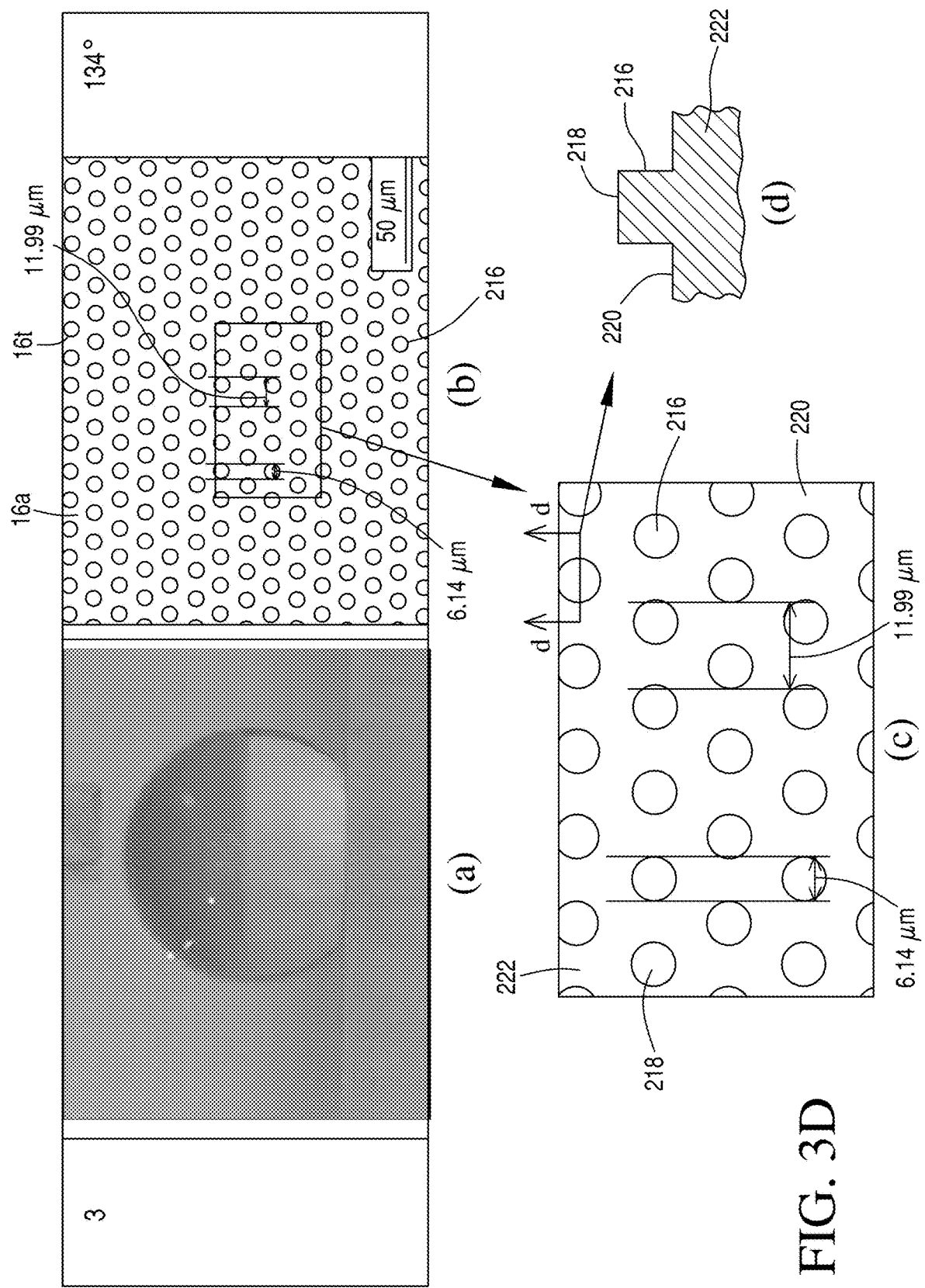

Referring to surface pattern 3 as disclosed in FIG. 3D, the texture 16t of the top surface 16a includes a plurality of circular (when viewed from above) protrusions 216 arranged in a repeating pattern so as to produce a water contact angle of approximately 134°. The protrusions 216 are substantially flat on their upper surface 218 which extends approximately 10 μm above the surface 220 of the underlying substrate 222 (although it is appreciated the height of each protrusion may be approximately 5 μm to 20 μm). Each circle has a diameter of approximately 6.14 μm. As to the spacing of the protrusions 216, they are spaced approximately 11.99 μm when measured from the center of the protrusions 216 to the center of the next adjacent protrusions 216.

Surface 4

Figure 3E:
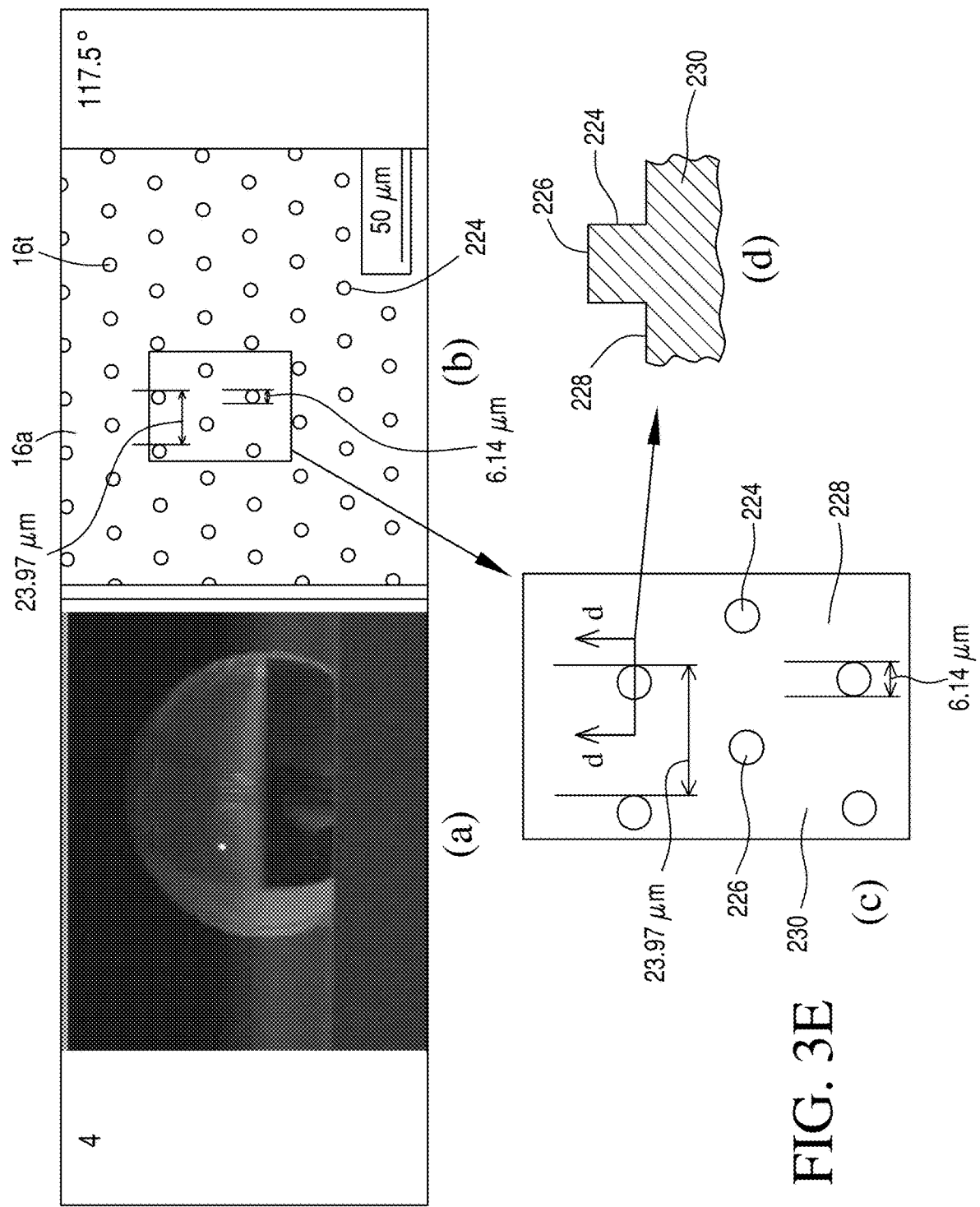

Referring to surface pattern 4 as disclosed in FIG. 3E, the texture 16t of the top surface 16a includes a plurality of circular (when viewed from above) protrusions 224 arranged in a repeating pattern so as to produce a water contact angle of approximately 117.5°. The protrusions 224 are substantially flat on their upper surface 226 which extends approximately 10 μm above the surface 228 of the underlying substrate 230 (although it is appreciated the height of each protrusion may be approximately 5 μm to 20 μm). Each circle has a diameter of approximately 6.14 μm. As to the spacing of the protrusions 224, they are spaced approximately 23.97 μm when measured from the center of the protrusions 224 to the center of the next adjacent protrusions 224.

Surface 5

Figure 3F:
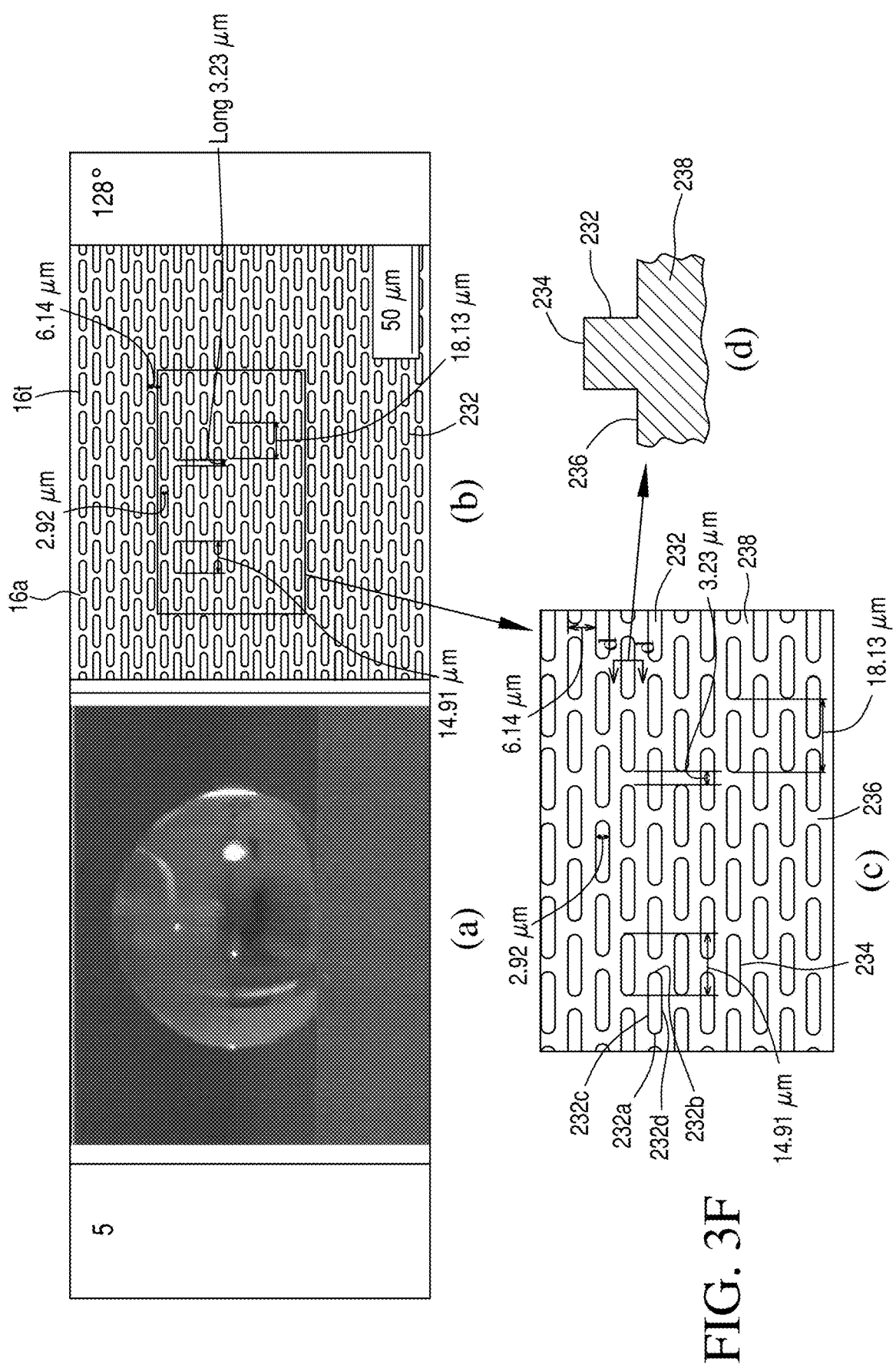
Figure 3G:
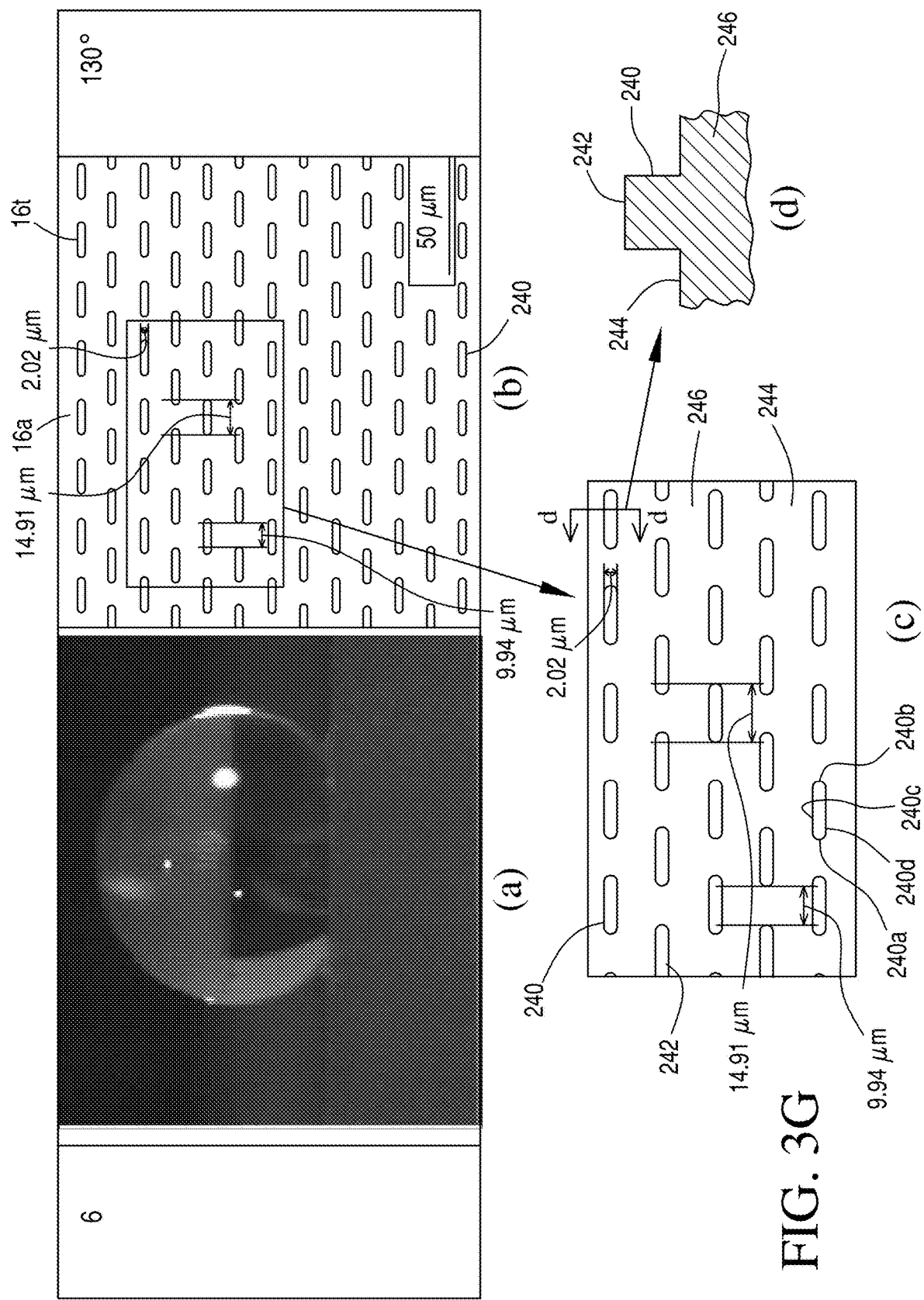
Figure 3H:
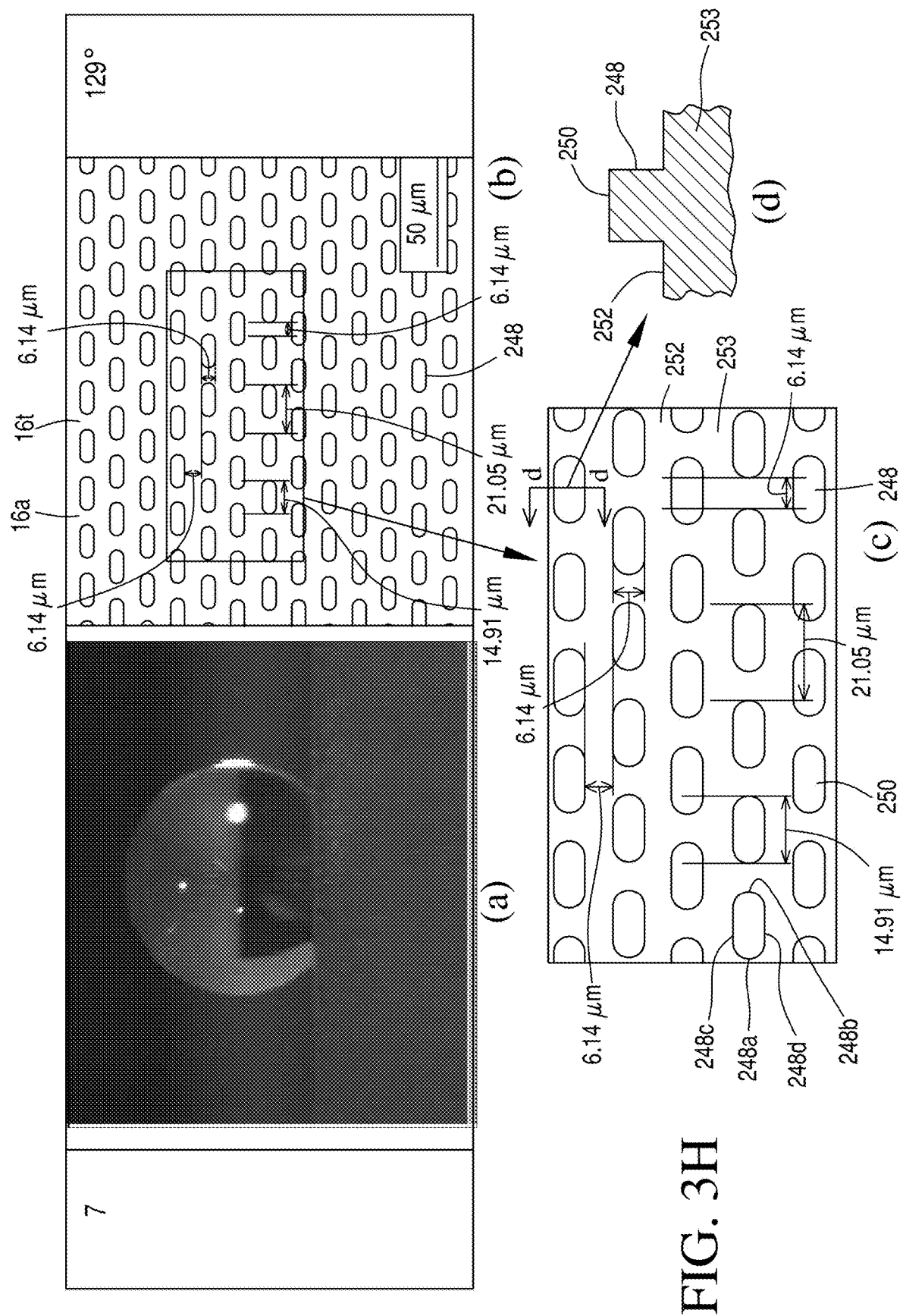

Referring to surface pattern 5 as disclosed in FIG. 3F, the texture 16t of the top surface 16a includes a plurality of capsule shaped (when viewed from above) protrusions 232 arranged in a repeating pattern so as to produce a water contact angle of approximately 128°. The term "capsule shaped" is intended to refer to an elongated two dimensional body having a first semi-circular end 232a and a second semi-circular end 232b with parallel side walls 232c, 232d connecting the first semi-circular end 232a to the second semi-circular end 232b. The protrusions 232 are substantially flat on their respective upper surfaces 234 which extends approximately 10 μm above the surface 236 of the underlying substrate 238 (although it is appreciated the height of each protrusion may be approximately 5 μm to 20 μm). The protrusions 232 are aligned end to end in a series of parallel rows, wherein adjacent rows are 180° out of sync (that is, the center line of a protrusion 232 (in a an upper row) splitting the protrusion 232 between the first semi-circular end 232a and the second semi-circular end 232b is aligned with the midpoint center line extending between the first semi-circular end 232a of one protrusion 232 and the second semi-circular end 232b of an adjacent protrusion 232 (in a lower row adjacent the upper row)). Each protrusion 232 has a length of approximately 14.91 μm and a width of 2.92 μm. The distance between the first semi-circular end 232a of one protrusion 232 and the second semi-circular end 232a of another adjacent protrusion 232, wherein the longitudinal axes of the protrusions 232 are the same, is approximately 3.23 μm. The distance from an upper side wall 232c of an upper protrusion 232 and an upper side wall 232c a lower protrusion 232 lying directly below the upper protrusion 232, wherein the measurement is taken along a line perpendicular to the upper and lower side walls 232c, 232d, is approximately 6.14 μm.

Surface 6

Referring to surface pattern 6 as disclosed in FIG. 6, the texture 16t of the top surface 16a includes a plurality of capsule shaped (when viewed from above) protrusions 240 arranged in a repeating pattern so as to produce a water contact angle of approximately 130°. As discussed above, the term "capsule shaped" is intended to refer to an elongated two dimensional body having a first semi-circular end 240a and a second semi-circular end 240b with parallel side walls 240c, 240d connecting the first semi-circular end 240a to the second semi-circular end 240b. The protrusions 240 are substantially flat on their respective upper surfaces 242 which extends approximately 10 μm above the surface 244 of the underlying substrate 246 (although it is appreciated the height of each protrusion may be approximately 5 μm to 20 μm). The protrusions 240 are aligned end to end in a series of parallel rows, wherein adjacent rows are 180° out of sync (that is, the center line of a protrusion 240 (in a an upper row) splitting the protrusion 240 between the first semi-circular end 240a and the second semi-circular end 240b is aligned with the midpoint center line extending between the first semi-circular end 240a of one protrusion 240 and the second semi-circular end 240b of an adjacent protrusion 240 (in a lower row adjacent the upper row)). Each protrusion 240 has a length of approximately 14.91 μm and a width of 2.92 The distance between the first semi-circular end 240a of one protrusion 240 and the second semi-circular end 240b of another adjacent protrusion 240, wherein the longitudinal axes of the protrusions 240 are the same, is approximately 9.94 The distance from an upper side wall 240c of an upper protrusion 240 and an upper side wall 240c a lower protrusion 240 lying directly below the upper protrusion 240, wherein the measurement is taken along a line perpendicular to the upper and lower side walls 240c, 240d, is approximately 11.82 μm.

Surface 7

Referring to surface pattern 7 as disclosed in FIG. 7, the texture 16t of the top surface 16a includes a plurality of capsule shaped (when viewed from above) protrusions 248 arranged in a repeating pattern so as to produce a water contact angle of approximately 129°. As discussed above, the term "capsule shaped" is intended to refer to an elongated two dimensional body having a first semi-circular end 248a and a second semi-circular end 248b with parallel side walls 248c, 248d connecting the first semi-circular end 248a to the second semi-circular end 248b. The protrusions 248 are substantially flat on their respective upper surfaces 250 which extends approximately 10 μm above the surface 252 of the underlying substrate 253 (although it is appreciated the height of each protrusion may be approximately 5 μm to 20 μm). The protrusions 248 are aligned end to end in a series of parallel rows, wherein adjacent rows are 180° out of sync (that is, the center line of a protrusion 248 (in a an upper row) splitting the protrusion 248 between the first semi-circular end 248a and the second semi-circular end 248b is aligned with the midpoint center line extending between the first semi-circular end 248a of one protrusion 248 and the second semi-circular end 248b of an adjacent protrusion 248 (in a lower row adjacent the upper row)). Each protrusion 248 has a length of approximately 14.91 μm and a width of 6.14 μm. The distance between the first semi-circular end 248a of one protrusion 248 and the second semi-circular end 248b of another adjacent protrusion 248, wherein the longitudinal axes of the protrusions 248 are the same, is approximately 12.28 μm. The distance from an upper side wall 248c of an upper protrusion 248 and an upper side wall 248c of a lower protrusion 248 lying directly below the upper protrusion 248, wherein the measurement is taken along a line perpendicular to the upper and lower side walls 248c, 248d, is approximately 6.14 μm.

Surface 8

Figure 3I:
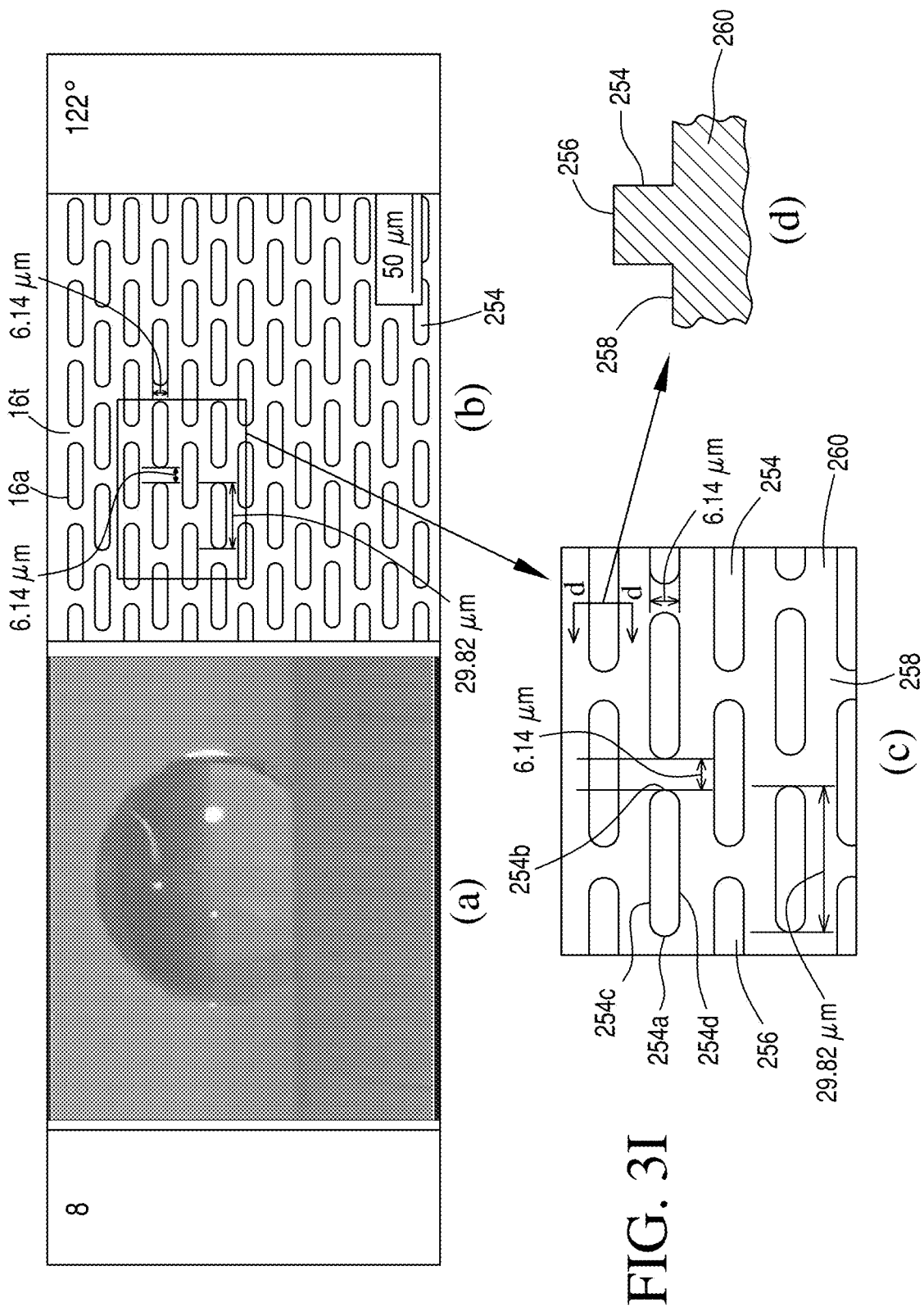

Referring to surface pattern 8 as disclosed in FIG. 3I, the texture 16t of the top surface 16a includes a plurality of capsule shaped (when viewed from above) protrusion 254 arranged in a repeating pattern so as to produce a water contact angle of approximately 122°. As discussed above, the term "capsule shaped" is intended to refer to an elongated two dimensional body having a first semi-circular end 254a and a second semi-circular end 254b with parallel side walls 254c, 254d connecting the first semi-circular end 254a to the second semi-circular end 254b. The protrusions 254 are substantially flat on their respective upper surfaces 256 which extends approximately 10 µm above the surface 258 of the underlying substrate 260 (although it is appreciated the height of each protrusion may be approximately 5 µm to 20 µm). The protrusions 254 are aligned end to end in a series of parallel rows, wherein adjacent rows are 180° out of sync (that is, the center line of a protrusion 254 (in a an upper row) splitting the protrusion 254 between the first semi-circular end 254a and the second semi-circular end 254b is aligned with the midpoint center line extending between the first semi-circular end 254a of one protrusion 254 and the second semi-circular end 254b of an adjacent protrusion 254 (in a lower row adjacent the upper row)). Each protrusion 254 has a length of approximately 29.82 µm and a width of 6.14 µm. The distance between the first semi-circular end 254a of one protrusion 254 and the second semi-circular end 254b of another adjacent protrusion 254, wherein the longitudinal axes of the protrusions 254 are the same, is approximately 6.14 µm. The distance from an upper side wall 254c of an upper protrusion 254 and an upper side wall 254c a lower protrusion 254 lying directly below the upper protrusion 254, wherein the measurement is taken along a line perpendicular to the upper and lower side walls 254c, 254d, is approximately 11.82 µm.

Surface 9

Figure 3J:
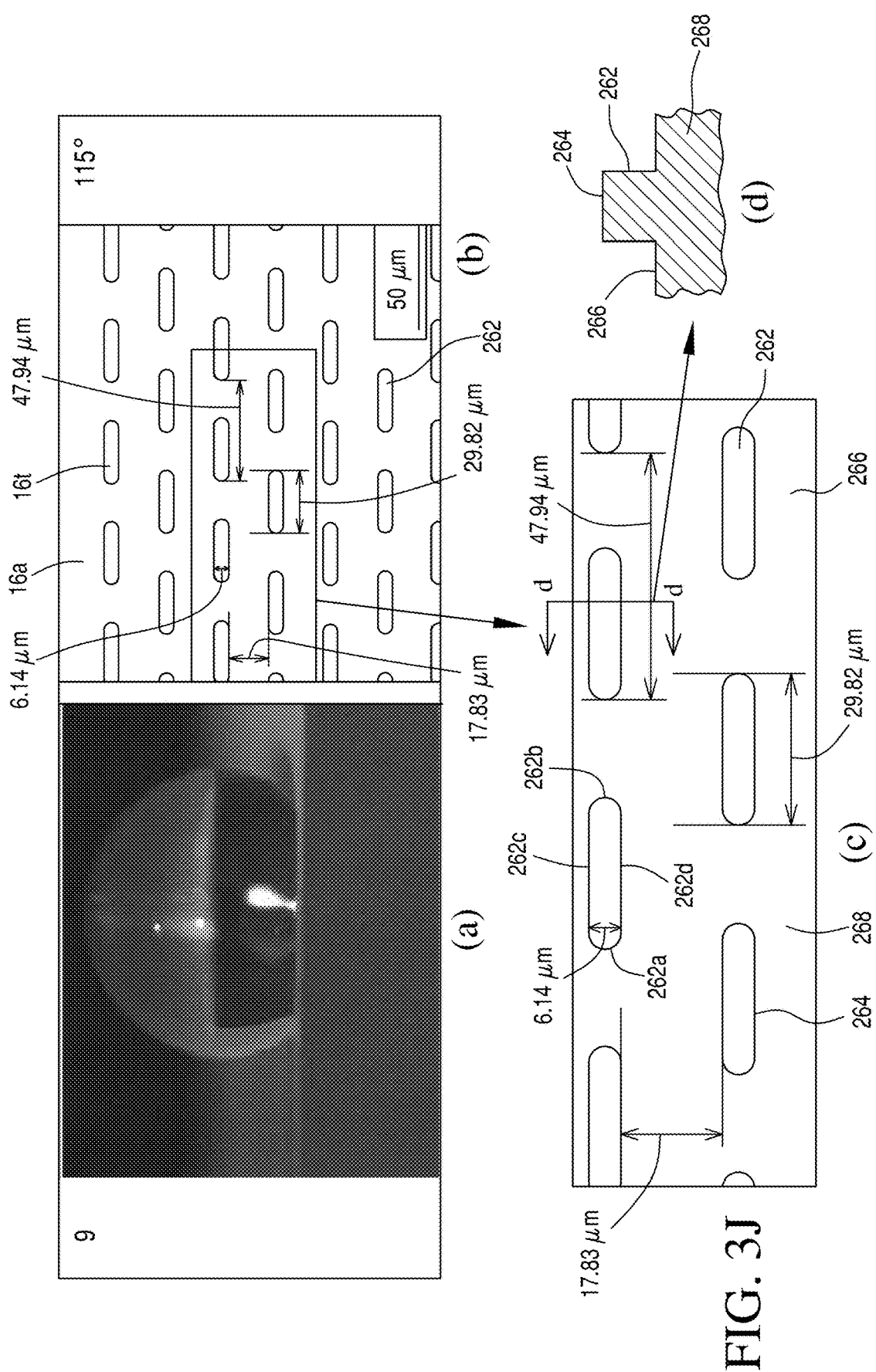

Referring to surface pattern 9 as disclosed in FIG. 3J, the texture 16t of the top surface 16a includes a plurality of capsule shaped (when viewed from above) protrusions 262 arranged in a repeating pattern so as to produce a water contact angle of approximately 115°. As discussed above, the term "capsule shaped" is intended to refer to an elongated two dimensional body having a first semi-circular end 262a and a second semi-circular end 262b with parallel side walls 262c, 262d connecting the first semi-circular end 262a to the second semi-circular end 262b. The protrusions 262 are substantially flat on their respective upper surfaces 264 which extends approximately 10 µm above the surface 264 of the underlying substrate 266 (although it is appreciated the height of each protrusion may be approximately 5 µm to 20 µm). The protrusions 262 are aligned end to end in a series of parallel rows, wherein adjacent rows are 180° out of sync (that is, the center line of a protrusion 262 (in a an upper row) splitting the protrusion 262 between the first semi-circular end 262a and the second semi-circular end 262b is aligned with the midpoint center line extending between the first semi-circular end 262a of one protrusion 262 and the second semi-circular end 262b of an adjacent protrusion 262 (in a lower row adjacent the upper row)). Each protrusion 262 has a length of approximately 29.82 µm and a width of 6.14 The distance between the first semi-circular end 262a of one protrusion 262 and the second semi-circular end 262b of another protrusion 262, wherein the longitudinal axes of the protrusions 262 are the same, is approximately 18.12 µm. The distance from an upper side will 262c of an upper protrusion 262 and an upper side wall 262c a lower protrusion 262 lying directly below the upper protrusion 262, wherein the measurement is taken along a line perpendicular to the upper and lower side walls 262c, 262d, is approximately 23.97 µm.

With the foregoing in mind, the preferred texture surface exhibiting circular protrusions will have a protrusion height of between 5 µm and 20 µm, and a circle diameter between 2.92 µm and 6.14 µm. Further, the preferred textured surface exhibiting circular protrusions will have spacing of the protrusions such that the distance from the center of the protrusions to the center of the next adjacent protrusions is approximately 6.14 µm to approximately 23.97 µm. As to a textured surface with capsule shaped protrusions, they preferably will have a protrusion height of between 5 µm and 20 µm, a length of approximately 14.91 µm to approximately 29.82 µm, a width of approximately 2.92 µm to approximately 6.14 µm, a distance between the first semi-circular end of one protrusion and the second semi-circular end of another protrusion of approximately 3.23 µm to approximately 18.12 µm, a distance from an upper side wall of an upper protrusion and an upper side wall a lower protrusion lying directly below the upper protrusion, wherein the measurement is taken along a line perpendicular to the upper and lower side walls, of approximately 6.14 µm to approximately 23.97 µm. It should be appreciated the term approximately is used above and throughout the present disclosure to suggest the potential for slight variations in measurement and manufacturing, and is understood by those skilled in the art to permit slight variations that would be functionally insignificant as they would still result in a textured surface exhibiting a desired water contact angle within accepted measurement and manufacturing tolerances.

As the textured surface 14a of the release sheet 14 is ultimately imparted to the top layer (that is, the textured 16t of the top surface 16a of the overlay paper layer 16 in accordance with the present invention) of the decorative laminate 100 formed using the textured release sheet 14, the resulting decorative laminate 100 is provided with a top surface 16a having texture 16t that is the same as that of the textured surface and will exhibit desired resistance to the formation of fingerprints. It is appreciated the decorative laminate may be any of the many resin based decorative laminates known to those of ordinary skill in the art. In accordance with one embodiment of the present invention, and as discussed above, the decorative laminate includes an overlay layer sheet 16, or top layer, a decorative sheet 18 and a core 20.

More particularly, and as will be described in greater detail below, the decorative laminate 100 includes an exterior overlay paper layer 16, a decorative layer 18, and a core layer 20. While a specific layering pattern is disclosed in accordance with a preferred embodiment of the present invention, the layering pattern may be varied, somewhat, without departing from the spirit of the present invention.

The overlay paper layer 16 is preferably a melamine impregnated paper layer. The decorative layer 18 is a conventional pattern sheet positioned directly beneath the overlay paper layer 16. When the decorative laminate 100 is fully heated and pressed, as will be discussed below in greater detail, the overlay paper layer 16 becomes translucent, fully exposing the decorative layer 18. In addition, it is the top surface 16a of the overlay paper layer 16 which takes on the texture 16t imparted by the release sheet 14. With this in mind, the decorative layer 18 is substantially responsible for the aesthetic appearance of the finished decorative laminate 100.

Decorative layers 18 are chosen from a wide array of sheets. For example, the decorative layer 18 may be a solid color (for example, white) or include an aesthetically appealing pattern. As discussed above, the decorative layer 18 provides the decorative laminate 100 with an attractive appearance. The overlay paper layer 16 and the decorative layer 18 also dictate the surface characteristics of the final decorative laminate 100. For example, the composition of the overlay paper layer 16 and decorative layer 18 help to dictate the decorative laminate's resistance to chemical agents, heat, light, shock and abrasion.

Decorative sheets 18 are commonly manufactured from high quality 80-202 grams/m² ream weight, pigment filled, alpha cellulose paper impregnated with a water alcohol or water solution of melamine-formaldehyde resin. The resin impregnated decorative sheets 18 are subsequently dried, partially cured, and finally cut into sheets. The pigment filled, alpha cellulose paper of the decorative sheet, may include a solid color, a decorative design, or a photo-gravure reproduction of natural materials, such as, wood, marble, leather, etc. The aesthetic characteristics of the cellulose paper are revealed as the laminate's decorative design upon completion of the decorative laminate.

The core layer 20 is preferably a plurality of phenolic resin impregnated sheets 20a, 20b, 20c, although other materials may be used without departing from the spirit of the present invention. For example, the core layer 20 includes sheets of 120-323 grams per square meter dry phenolic resin impregnated Kraft paper. The Kraft paper is impregnated throughout and bonded with a substantially cured phenolic resin which has been converted to a thermoset state during the initial laminating step.

In accordance with the present invention, the decorative laminate 100 of the present invention is formed in much the same manner as conventional decorative laminates. The layers are first stacked and placed between steel plates with the release sheet 14 covering the overlay paper layer 16. The decorative laminate stack 10 is then subjected to temperatures in the range of 121° C.-160° C. and pressure of about 56.24 kg/cm2 to 112.48 kg/cm2 for a time sufficient to consolidate the laminate and cure the resins (generally about 25 minutes to an hour).

The pressure and heat force the resin in the paper sheets to flow, cure and consolidate the sheets into a unitary laminated mass referred to in the art as a decorative high pressure laminate 100 having the hydrophobic textured surface 16t as described above which is imparted by the textured surface 14a of the release sheet 14. Generally, more than one decorative laminate is formed at one time. Multiple decorative laminates are formed by inserting a plurality of sheets in a stack. The textured release sheets 14 are positioned between the assembled sheets to separate the various decorative laminates stacked together and to impart the desired texture thereto. The textured surface 14a of the release sheet 14 is oriented against the top surface 16a (in this case the upper surface of the overlay paper layer 16) of the decorative laminate sheet assembly 12, be it the decorative sheet 18 or overlay paper layer 16, with the smooth top side (or back surface) 14t of the textured release sheet 14 positioned against the core stock of an adjacent lay-up or steel plate. Upon pressing between suitable laminate press plates, the textured release sheet 14 imparts the hydrophobic texture 16t described above to the top surface 16a of the first lay-up (in this case the upper surface of overlay paper layer 16 creating the textured surface 16t discussed above), and serves to allow release between the first lay-up and the adjacent lay-up. A platen press assembly, as is well known in the lamination art, provides the necessary heat and/or pressure during lamination. After consolidation, the release sheets allow the individual decorative laminates to be separated.

Figure 4:
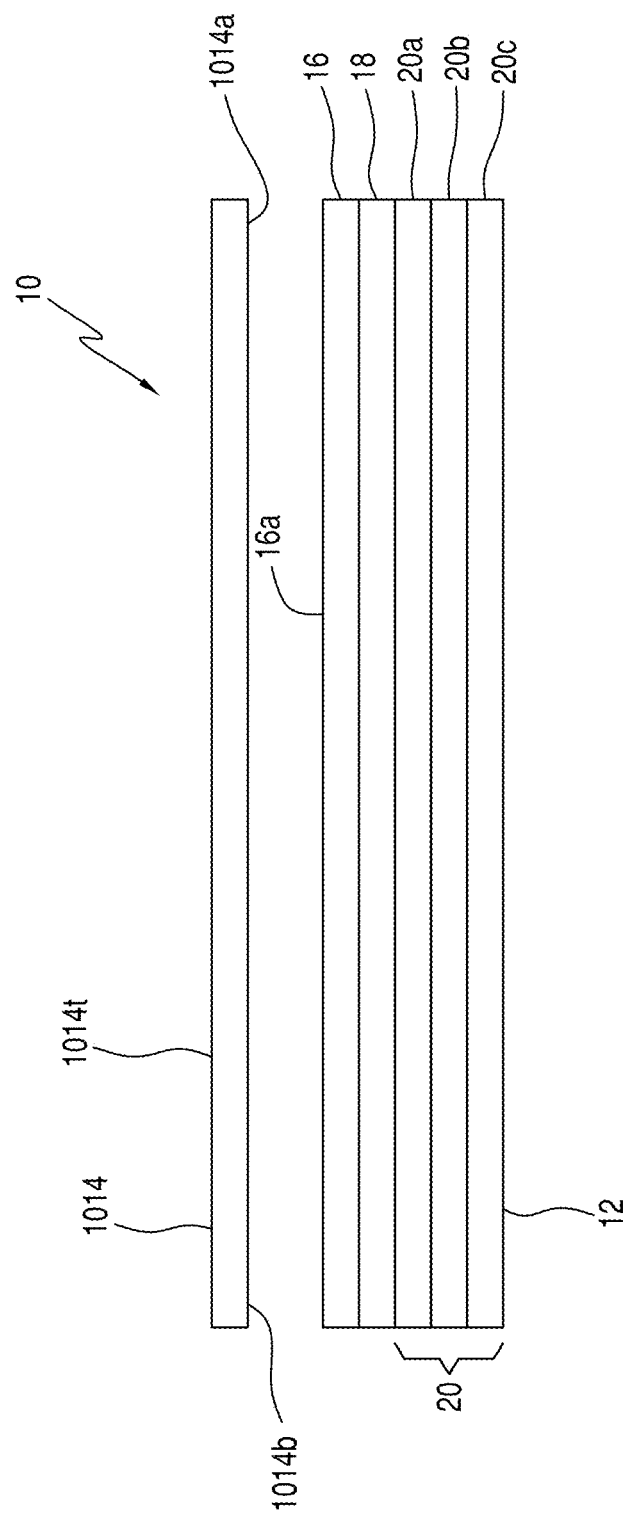
FIG. 4 is a schematic of a laminate sheet assembly and press plate in accordance with an alternate embodiment of the present invention.
Figure 5:
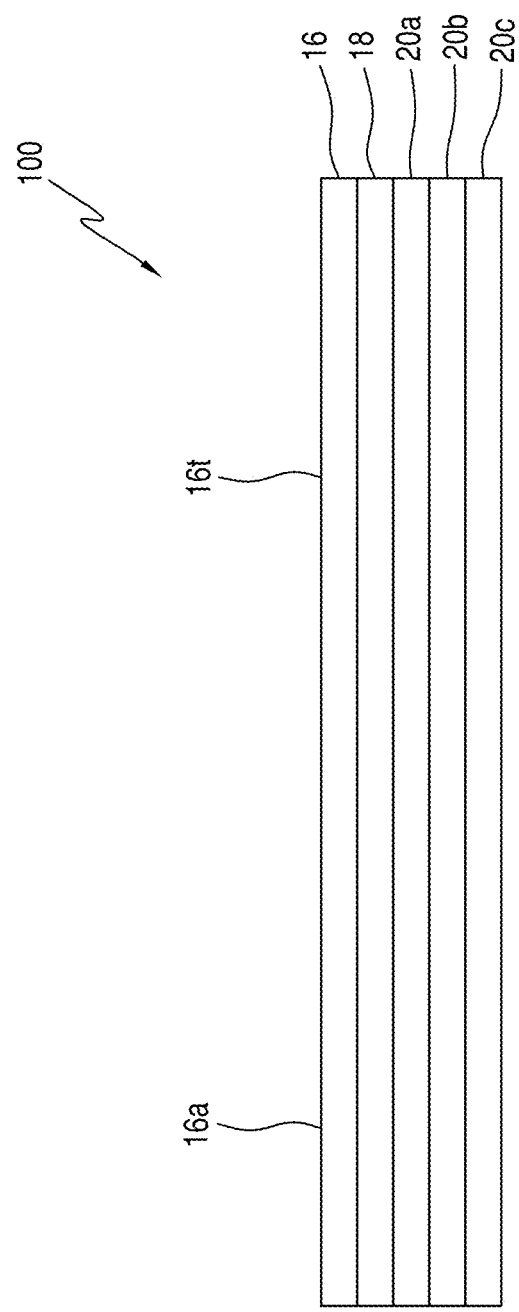
FIG. 5 is a schematic of a decorative laminate produced in accordance with the embodiment shown with reference to FIG. 4.

Referring to FIGS. 4 and 5, the decorative laminate including a desired textured surface in accordance with the present invention may also be fabricated in a single batch process with the textured release sheet being replaced by a texture imparting member in the form of a textured press plate 1014. In accordance with such an embodiment, a decorative laminate sheet assembly 12 composed of an exterior overlay paper layer 16, a decorative layer 18, and a core layer 20 (as discussed above) is formed. The decorative laminate sheet assembly 12 is consolidated using a textured press plate 1014 having a top side 1014t and a bottom side 1014b with a textured surface 1014a. As with the textured release sheet of the prior embodiment, the textured press plate 1014 provides a textured surface to a resulting decorative laminate, wherein the textured surface is the same as that discussed above with reference to FIGS. 3B-3J and results in a decorative laminate that is not susceptible to a build-up of fingerprints on the surface thereof. The applied texture's physical attribute functions to lower the surface energy to achieve the fingerprint proof properties (and also provide self-cleaning properties).

The decorative laminate sheet assembly 12 is stacked in preparation for the heating and pressure steps used to consolidate the laminate. The textured press plate 1014 is also prepared. In accordance with a preferred embodiment the textured press plate is a stainless steel plate. During fabrication, the textured press plate 1014 is positioned on the top surface 16a (in the case of the present laminate sheet assembly it is the upper surface of the overlay sheet 16) of the laminate sheet assembly 12, and heat and pressure are applied to the laminate sheet assembly 12 sufficient to bond the layers of the decorative laminate sheet assembly 12. When the textured press plate 1014 is removed from the top layer 16a of the formed decorative laminate 100, a decorative laminate exhibiting desired texture characteristics is revealed.

The textured press plate 1014 is formed with a textured surface 1014a exhibiting anti-reflective, hydrophobic and oleophobic characteristics leading to a fingerprint proof surface, that is, a surface not showing fingerprints and remaining clean and clear dispute regular use. The texture applied to the textured press plate 10 14 (and ultimately applied to the top surface 16a of the resulting decorative laminate 100) increases the water contact angles for water placed upon the textured surface, suggesting that the texture has become more hydrophobic. When the texture 1014a of the press plate 1014 is applied to the decorative laminate 100, the texture 16t of the top surface 16a of the laminate 100 takes on the texture 1014a of the textured press plate making the laminate 100 less susceptible to the formation of annoying and undesirable fingerprints thereon.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A decorative laminate lay-up used in the manufacture of decorative laminates, comprising:
   a decorative laminate sheet assembly composed of resin impregnated paper layers, the decorative laminate sheet assembly includes an overlay paper layer composed of a melamine impregnated paper layer, a decorative layer composed of alpha cellulose paper impregnated with a water alcohol or water solution of melamine-formaldehyde resin, and a core layer composed of a plurality of phenolic resin impregnated sheets; and a textured release sheet including a substrate and a textured acrylic release coating, the textured acrylic coating defining an electron beam cured textured surface, wherein the textured acrylic release coating is an electron beam radiation curable material composed of acrylic functional materials and silicone release agents applied to one surface of the substrate and subsequently pressed against a replicative surface exhibiting anti-reflective, hydrophobic and oleophobic characteristics to cause the electron beam radiation curable material to conform to the replicative surface, the electron beam radiation curable material is then irradiated with electron beam radiation to cure the electron beam radiation curable material and form the textured acrylic release coating, the textured release sheet being positioned on the overlay paper layer that defines a top surface of the decorative laminate sheet assembly, the textured release sheet providing a textured surface to decorative laminates resulting from processing of the decorative laminate sheet assembly, wherein the textured release sheet includes the electron beam cured textured surface exhibiting anti-reflective, hydrophobic and oleophobic characteristics leading to a fingerprint proof surface;

wherein the decorative laminate sheet assembly and the textured release sheet are subjected to heat and pressure for a time sufficient to consolidate the decorative laminate sheet assembly and cure resins to form the decorative laminate;

wherein the textured surface of the textured release sheet includes a plurality of protrusions wherein the protrusions are circular and have a height of between 5 μm and 20 μm, a circle diameter between 2.92 μm and 6.14 μm, and are spaced from a center of the protrusions to a center of next adjacent protrusions by a distance of approximately 6.14 μm to approximately 23.97 μm or wherein the plurality of protrusions are capsule shaped and have a height of between 5 μm and 20 μm, a length of approximately 14.91 μm to approximately 29.82 μm, a width of approximately 2.92 μm to approximately 6.14 μm, and the plurality of protrusions are arranged on the textured surface of the textured release sheet such that a distance between a first semi-circular end of one protrusion and a second semi-circular end of another protrusion of approximately 3.23 μm to approximately 18.12 μm, a distance from an upper side wall of an upper protrusion and an upper side wall a lower protrusion lying directly below an upper protrusion of approximately 6.14 μm to approximately 23.97 μm.

2. The decorative laminate lay-up according to claim 1, wherein the textured surface of the textured release sheet includes a plurality of protrusions resulting in the decorative laminate having a water contact angle of >110°.

3. The decorative laminate lay-up according to claim 2, wherein the protrusions are circular and have a height of between 5 μm and 20 μm, a circle diameter between 2.92 μm and 6.14 μm, and are spaced from a center of the protrusions to a center of next adjacent protrusions by a distance of approximately 6.14 μm to approximately 23.97 μm.

4. The decorative laminate lay-up according to claim 1, wherein the plurality of protrusions are capsule shaped and have a height of between 5 μm and 20 μm, a length of approximately 14.91 μm to approximately 29.82 μm, a width of approximately 2.92 μm to approximately 6.14 μm, and the plurality of protrusions are arranged on the textured surface of the textured release sheet such that a distance between a first semi-circular end of one protrusion and a second semi-circular end of another protrusion of approximately 3.23 μm to approximately 18.12 μm, a distance from an upper side wall of an upper protrusion and an upper side wall a lower protrusion lying directly below an upper protrusion of approximately 6.14 μm to approximately 23.97 μm.

5. A decorative laminate manufactured in accordance with the method comprising:
assembling a decorative laminate sheet assembly composed of resin impregnated paper layers, the decorative laminate sheet assembly includes an overlay paper layer composed of a melamine impregnated paper layer, a decorative layer composed of alpha cellulose paper impregnated with a water alcohol or water solution of melamine-formaldehyde resin, and a core layer composed of a plurality of phenolic resin impregnated sheets;
positioning a texture imparting member on a top surface of the decorative laminate sheet assembly, the texture imparting member including a substrate and a textured acrylic release coating, the textured acrylic coating defining an electron beam cured textured surface, wherein the textured acrylic release coating is an electron beam radiation curable material composed of acrylic functional materials and silicone release agents applied to one surface of the substrate and subsequently pressed against a replicative surface exhibiting anti-reflective, hydrophobic and oleophobic characteristics to cause the electron beam radiation curable material to conform to the replicative surface, the electron beam radiation curable material is then irradiated with electron beam radiation to cure the electron beam radiation curable material and form the textured acrylic release coating, the texturing imparting member being a textured release sheet positioned on the overlay paper layer that defines the top surface of the decorative laminate sheet assembly, the textured release sheet providing the textured surface to decorative laminates resulting from processing of the decorative laminate sheet assembly, wherein the textured surface exhibits anti-reflective, hydrophobic and oleophobic characteristics leading to a fingerprint proof surface;
applying heat and pressure to the decorative laminate sheet assembly and the texture imparting member sufficient to bond layers of the decorative laminate sheet assembly for the formation of a decorative laminate;
removing the texture imparting member from the top surface of the decorative laminate revealing a textured surface exhibiting anti-reflective, hydrophobic and oleophobic characteristics leading to a fingerprint proof surface;
wherein the textured surface of the textured release sheet includes a plurality of protrusions wherein the protrusions are circular and have a height of between 5 μm and 20 μm, a circle diameter between 2.92 μm and 6.14 μm, and are spaced from a center of the protrusions to a center of next adjacent protrusions by a distance of approximately 6.14 μm to approximately 23.97 μm or wherein the plurality of protrusions are capsule shaped and have a height of between 5 μm and 20 μm, a length of approximately 14.91 μm to approximately 29.82 μm, a width of approximately 2.92 μm to approximately 6.14 μm, and the plurality of protrusions are arranged on the textured surface of the textured release sheet such that a distance between a first semi-circular end of one protrusion and a second semi-circular end of another protrusion of approximately 3.23 μm to approximately 18.12 μm, a distance from an upper side wall of an upper protrusion and an upper side wall a lower protrusion lying directly below an upper protrusion of approximately 6.14 µm to approximately 23.97 µm.

6. The decorative laminate according to claim 5, wherein the textured surface of the textured release sheet includes a plurality of protrusions resulting in the decorative laminate having a water contact angle producing a water contact angle of >110°.

7. The decorative laminate according to claim 6, wherein the protrusions are circular and have a height of between 5 µm and 20 µm, a circle diameter between 2.92 µm and 6.14 µm, and are spaced from a center of the protrusions to a center of next adjacent protrusions by a distance of approximately 6.14 µm to approximately 23.97 µm.

8. The decorative laminate according to claim 6, wherein the plurality of protrusions are capsule shaped and have a height of between 5 µm and 20 µm, a length of approximately 14.91 µm to approximately 29.82 µm, a width of approximately 2.92 µm to approximately 6.14 µm, and the plurality of protrusions are arranged on the textured surface of the textured release sheet such that a distance between a first semi-circular end of one protrusion and a second semi-circular end of another protrusion of approximately 3.23 µm to approximately 18.12 µm, a distance from an upper side wall of an upper protrusion and an upper side wall a lower protrusion lying directly below an upper protrusion of approximately 6.14 µm to approximately 23.97 µm.

\* \* \* \* \*